(12) United States Patent
Ertel

(10) Patent No.: US 6,910,571 B1
(45) Date of Patent: Jun. 28, 2005

(54) MULTI-SECTION CONVEYOR DRIVE ROLLER

(75) Inventor: Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 10/438,420

(22) Filed: May 15, 2003

(51) Int. Cl.[7] .................. B65G 13/02; B65G 13/00; B25F 5/02; B25F 13/00
(52) U.S. Cl. .................. 198/780; 193/35 R; 193/37; 492/38
(58) Field of Search .................. 198/780, 840; 193/35 R, 37; 474/168, 174, 184, 185, 186; 492/38

(56) References Cited

U.S. PATENT DOCUMENTS

| | | | | |
|---|---|---|---|---|
| 1,040,993 A | * | 10/1912 | Bakke | .................. 492/38 |
| 2,372,378 A | * | 3/1945 | Hlavaty | .................. 474/108 |
| 3,052,395 A | * | 9/1962 | Scott | .................. 226/190 |
| 3,670,381 A | * | 6/1972 | Schoffmann | .................. 492/38 |
| 4,175,689 A | * | 11/1979 | Parker | .................. 226/190 |
| 5,203,447 A | | 4/1993 | Ewert | |
| 5,758,242 A | * | 5/1998 | Malespin et al. | .................. 492/38 |
| 6,109,427 A | * | 8/2000 | Hosch et al. | .................. 198/835 |

* cited by examiner

*Primary Examiner*—Gene O. Crawford
(74) *Attorney, Agent, or Firm*—Andrus, Sceales, Starke & Sawall, LLP

(57) ABSTRACT

A multi-section conveyor roller is engageable with a conveyor belt moveably mounted on a conveyor frame assembly. The roller includes a rotatable mounting hub connected to the conveyor frame assembly, and a plurality of adjacently disposed roller segments fixed to the mounting hub to form belt-engaging, curved outer wall surfaces. The outer wall surfaces are separated by a number of gaps, at least one of the gaps receiving rib structure provided on the conveyor belt for maintaining proper movement of the conveyor belt on the conveyor frame assembly.

22 Claims, 5 Drawing Sheets

MULTI-SECTION CONVEYOR DRIVE ROLLER

FIELD OF THE INVENTION

The present invention relates generally to endless belt conveyors. More particularly, the present invention pertains to an endless belt conveyor utilizing a roller construction which maintains belt tracking and drive traction with the belt without requiring machining of the peripheral wall of the roller.

BACKGROUND OF THE INVENTION

Typically, the endless belt of a conveyor is driven either by an end drive unit positioned to drive a spindle or roller located at either end of a conveyor frame, or by a center drive unit positioned along the length of the conveyor frame and mounted beneath the conveyor frame. In a center drive unit, the continuous belt is wound through a series of rollers, including a drive roller and a tensioning roller, to impart the required force to the conveyor belt. One such center drive unit is illustrated in Ewert U.S. Pat. No. 5,203,447, the disclosure which is hereby incorporated by reference. As can be understood in the Ewert patent, the endless belt is entrained around six separate rollers (two drive rollers, two idler rollers and two belt tensioning rollers) positioned in a tortured path beneath the conveyor frame. The tortured path increases the driven traction on them belt due to the belt tension and the degree of wrap of the belt around the drive rollers.

Although the center drive unit illustrated in the '447 patent is efficient for driving the conveyor belt, threading the conveyor belt through the center drive unit is a tedious and time consuming task. Further, the multiple rollers require additional parts and manufacturing costs, such as for machining of the outer walls of the various rollers.

An attempt to improve upon the design of the center drive unit is described in pending U.S. patent application Ser. No. 10/385,906 filed March 11, 2003, the disclosure of which is herein incorporated by reference. In this construction, the conveyor belt is passed over a single guide roller, beneath a single drive roller and over a single tensioning roller. Such a design minimizes the number of components and provides a compact system that can easily be threaded with the conveyor belt to obtain a sufficient degree of belt wrap for achieving belt traction.

While this center drive unit is a significant advance over the Ewert arrangement, it is still necessary to machine the peripheral surface of the drive roller to acquire the smooth surface for proper engagement with the belt. Because some drive rollers may be four feet in length and six inches in diameter, such machining can be labor intensive and costly. It also remains necessary to machine the outer wall of the drive roller to form a circumferential groove for receiving a centrally located rib on the belt used to prevent lateral movement or skewing of the belt on the conveyor.

SUMMARY OF THE INVENTION

It is one object of the present invention to provide a conveyor roller construction which maintains the drive traction on the belt and supports belt tracking without requiring machining of the external surface of the roller.

It is also an object of the present invention to provide a multi-section or segmented conveyor roller construction which is used to replace the machined, one-piece, cylindrical conveyor roller.

It is a further object of the present invention to provide a segmented conveyor roller construction which is easy to assemble/disassemble and cost effective to produce.

In one aspect of the invention, a multi-section conveyor roller is engageable with a conveyor belt movably mounted on a conveyor frame assembly. The roller includes a rotatable mounting hub connected to the conveyor frame assembly and a plurality of roller segments fixed to the mounting hub to form belt-engaging, curved outer wall surfaces separated by a number of gaps. At least one of the gaps receives rib structure provided on the conveyor belt for maintaining proper movement of the conveyor belt on the conveyor frame assembly. The hub has an outer peripheral surface for receiving a plurality of fasteners, each of the fasteners having a retaining head. The roller segments have mounting portions connected to curved outer wall surfaces and are retained by the fasteners on the hub. The mounting portions are engaged flush against the outer peripheral surface of the hub. Each mounting portion has a base and a pair of outwardly diverging tabs inserted and held between the retaining heads of the fasteners and the peripheral surface of the hub. The roller segments include radially extending walls joining the curved outer wall surfaces to the mounting portions. The gaps include at least one circumferentially extending gap and a plurality of longitudinally extending gaps formed by end structure on the curved outer wall surfaces fixed to the mounting hub. The rib structure includes a rib extending longitudinally along the conveyor belt for engagement with the end structure forming the circumferentially extending gap. The longitudinally extending gaps provide access to the fasteners attached to the hub. The hub is operably coupled to a drive motor for rotating the roller segments fixed to the hub.

In another aspect of the invention, a conveyor construction has a frame assembly including a pair of spaced side members, a moveable conveyor belt positioned between the side members and a powered drive roller rotatably mounted on the frame assembly and engaged with the conveyor belt for moving the conveyor belt around the frame assembly. The invention is improved wherein the drive roller includes a plurality of adjacently disposed, identical roller segments fixed to a mounting hub rotatably attached to the framework to define aligned, beltengaging, outer wall surfaces spaced apart by a female belt tracking and assembly facilitating arrangement engageable with a male belt tracking structure located on the conveyor belt. In a preferred embodiment, the drive roller is included in a center drive unit mounted beneath the frame assembly. The female belt tracking and assembly facilitating arrangement includes at least one circumferentially extending gap defined by innermost edges of the adjacently disposed roller segments. The female belt tracking and assembly facilitating arrangement also includes a series of longitudinally extending gaps defined by axially extending ends of the curved outer wall surfaces. The male belt tracking structure includes at least one rib extending along a longitudinal axis of the conveyor belt on an inner surface thereof. The longitudinally extending gaps intersect the circumferentially extending gap at a 90 degree angle.

In yet another aspect of the invention, a segmented conveyor roller is engageable with a conveyor belt movably mounted on a conveyor frame assembly. The roller includes a driven mounting hub rotatably attached to the frame assembly. The hub has a hexagonally shaped outer peripheral surface defined by first, second, third, fourth, fifth and sixth adjacently disposed faces. The first, third and fifth faces carry a plurality of threaded fasteners having retaining heads. A set of six adjacently disposed roller segments is formed with three segments located on a first half of the hub and three segments being located on a second half of the hub. Each roller segment has a mounting portion and a curved outer wall surface connected by radially extending walls. Each mounting portion has a base flanked by a pair of outwardly diverging tabs. The base is engaged against the second, fourth and sixth faces, and the tabs of adjacently disposed roller segments extend partially across the first, third and fifth faces for engagement between the retaining heads of the fasteners and the first, third and fifth faces. With the roller segment attached to the hub, the curved outer wall surfaces are aligned with one another and include axially extending ends separated from each other to form three longitudinally extending gaps for providing access to the threaded fasteners so as to facilitate assembly/disassembly of the roller. The curved outer wall surfaces also include innermost ends separated from one another to form a single circumferentially extending, center gap for receiving a single longitudinally extending rib on the conveyor belt for maintaining belt tracking.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings

DETAILED DESCRIPTION OF THE INVENTION

Figure 1:
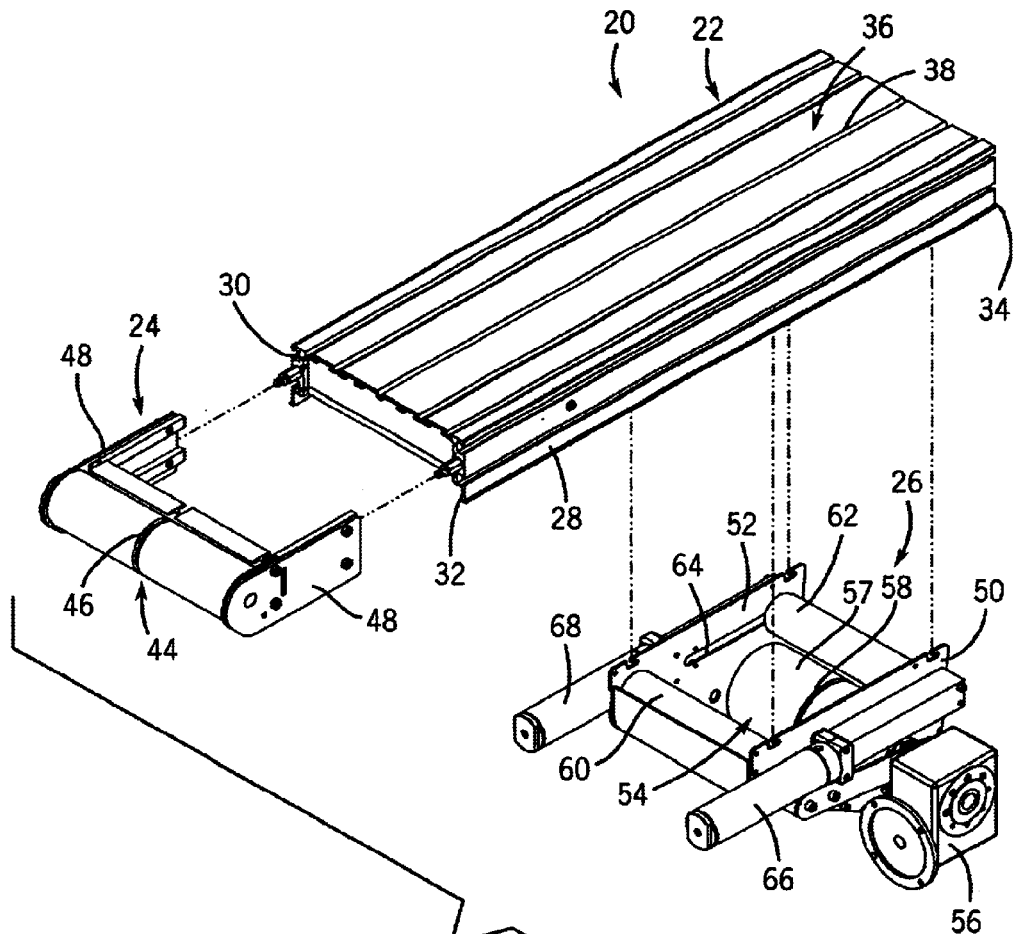
FIG. 1 is an exploded, perspective view of a portion of a modular frame conveyor illustrating a center drive unit having a conventional drive roller.
Figure 5:
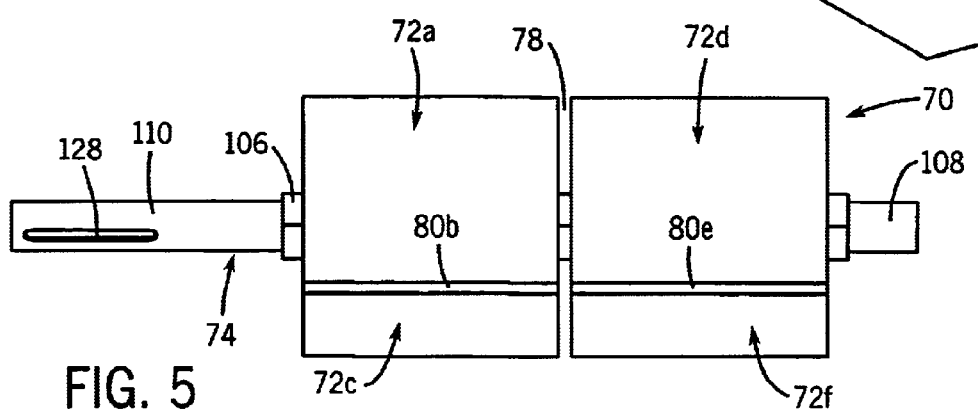
FIG. 5 is an elevational view taken from the right side of the drive roller in FIG. 4.

FIG. 1 illustrates a conveyor assembly 20 including a conveyor frame assembly 22, a tensioning section 24 and a center drive unit 26 as generally set forth in copending U.S. patent application Ser. No. 10/385,906 filed Mar. 11, 2003, the disclosure of which is herein incorporated by reference.

Figure 4:
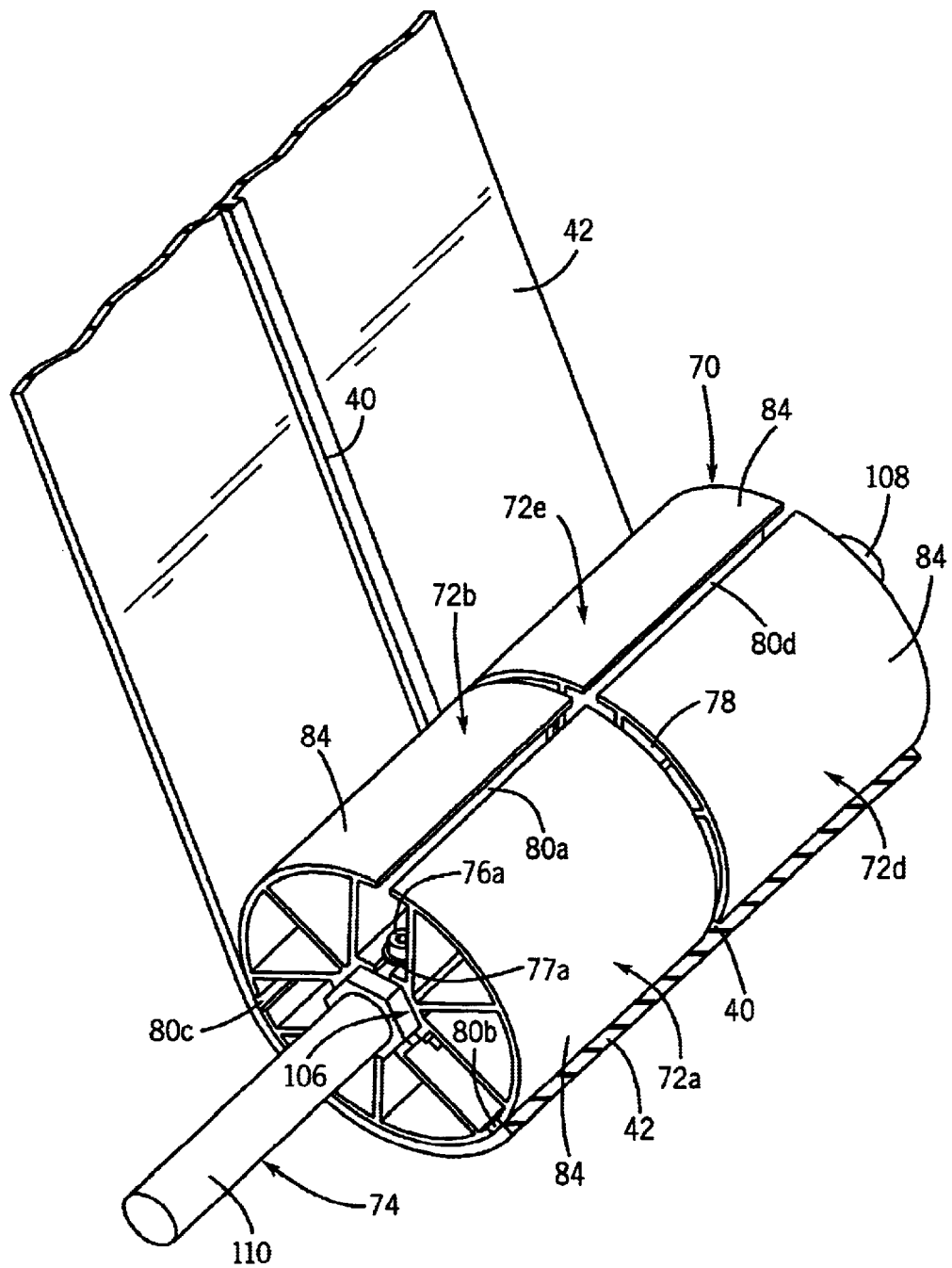
FIG. 4 is a perspective view of the assembled drive roller of FIG. 3 showing its engagement with a conveyor belt.
Figure 7:
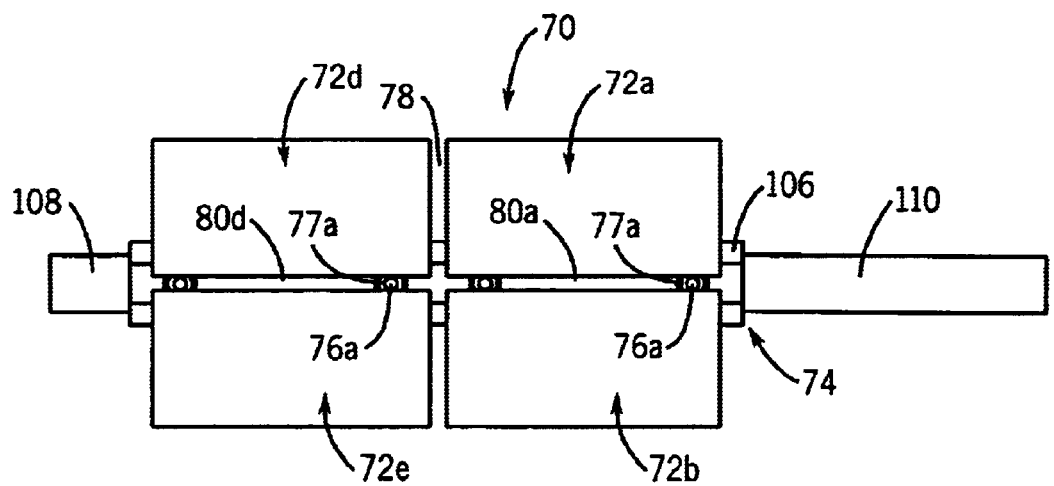
FIG. 7 is a plan view of the drive roller in FIG. 4.
Figure 8:
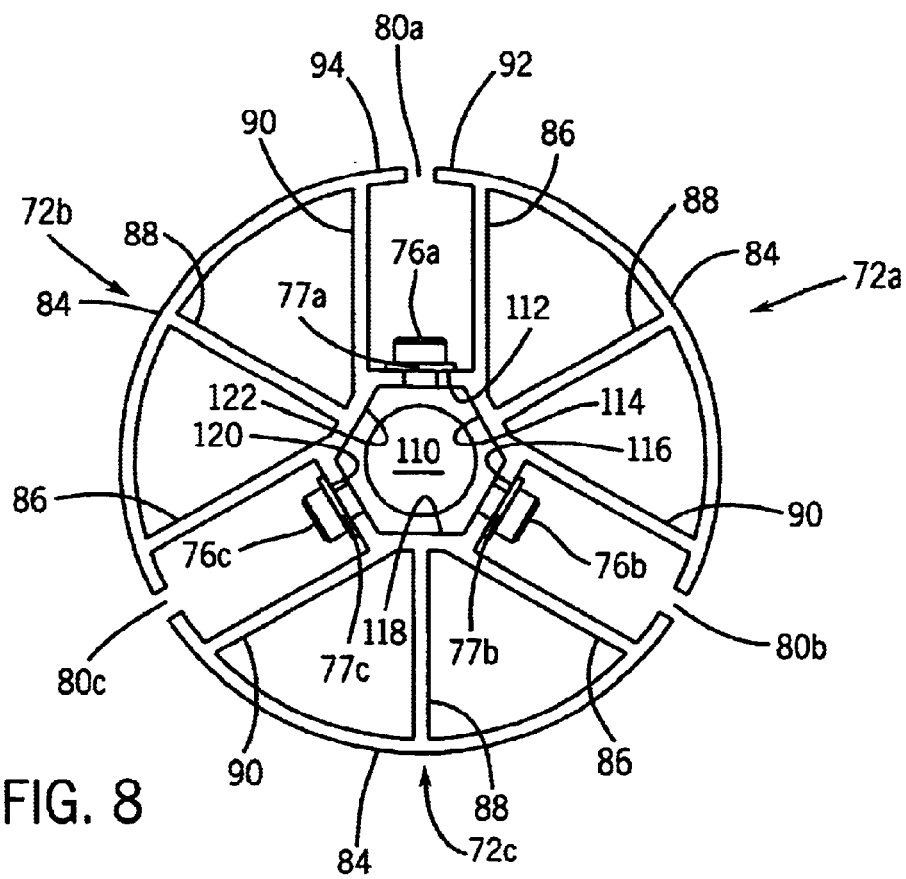
FIG. 8 is a view of the drive roller taken from the left end of FIG. 5.

The conveyor frame assembly 22 includes a pair of side frame members 28, 30 that each extend between a first end 32 and a second end 34. The side frame members 28, 30 are spanned by a center bed plate assembly 36 having a center groove 38 that receives a centrally located rib 40 formed on the inner surface of an endless conveyor belt 42 as shown in FIG. 4. The center groove 38 aids and provides the proper tracking of the moving conveyor belt 42 along the conveyor frame assembly 22. The tensioning unit 24 is attached to the first end of the conveyor frame assembly 22 and includes a single idler roller 44 having a center groove 46 for receiving the rib 40 formed on the inner surface of the conveyor belt 42 so as to further aid in belt tracking. The idler roller 44 is mounted for rotation between a pair of head plates 48, and is moved inwardly and outwardly with a mounting assembly (not shown) relative to the side frame members 28, 30 so as to adjust tension on the conveyor belt 42.

Figure 2:
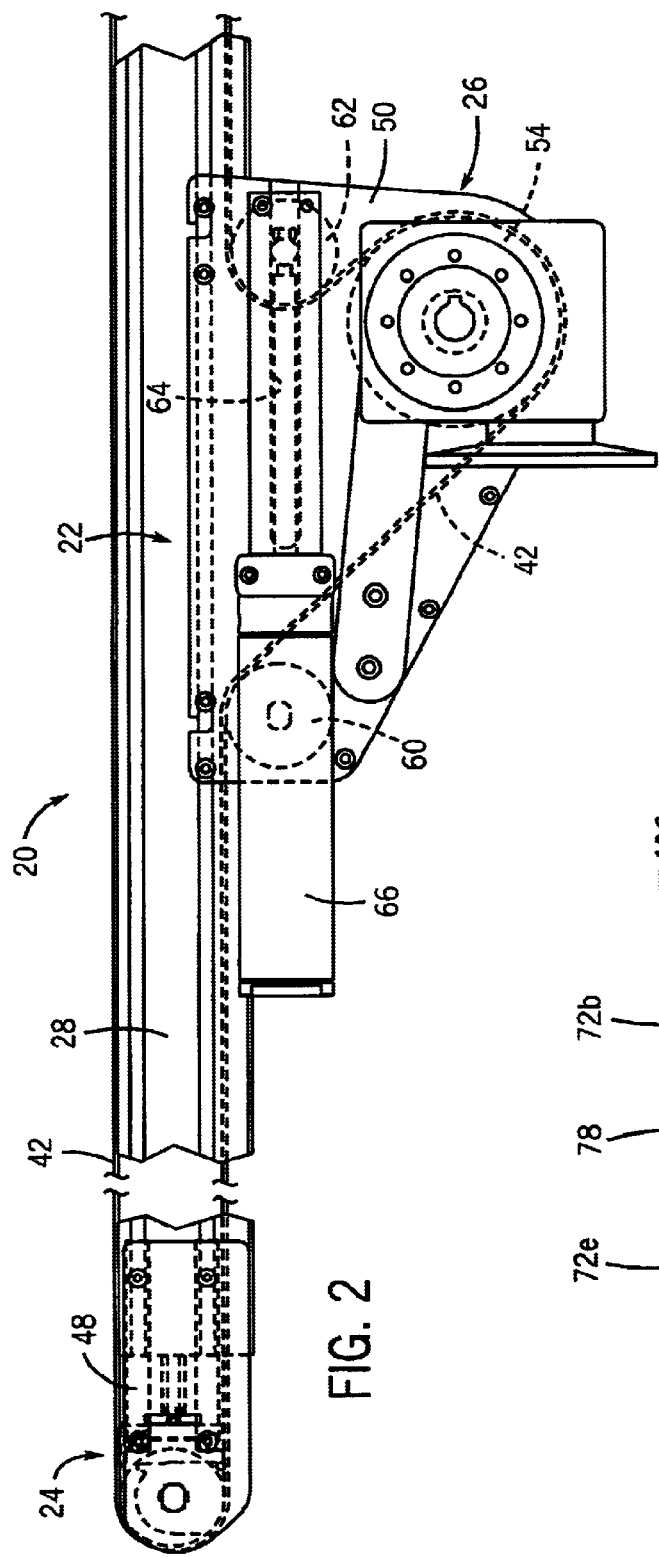
FIG. 2 is a side view of the center drive unit in FIG. 1.

The conveyor belt 42 is driven by the center drive unit 26 in situations in which the conveyor frame assembly 22 is not equipped with a drive section on its second end 34. The center drive unit 26 is mounted to the side frame members 28, 30 and extends beneath the conveyor frame assembly 22. The center drive unit includes a pair of spaced side plates 50, 52 used to effect the mounting of the entire structure to the bottom of the conveyor frame assembly 22. The center drive unit 26 also includes a unitary drive roller 54 which is mounted for rotation between the side plates 50, 52. The drive roller 54 has one end that is coupled to a drive motor 56 which provides the required motor force to rotate the drive roller 54 and thus move the conveyor belt 42. An outer or peripheral wall 57 of the drive roller 54 is normally formed with a smooth surface for engagement with the belt 42. A center groove 58 is formed in the drive roller peripheral wall 57 for receiving the rib 40 on conveyor belt 42 to once again aid in belt tracking. The center drive unit 26 further includes a stationary guide roller 60 and a moveable tensioning roller 62 which are both mounted for rotation between the side plates 50, 52. As seen in FIG. 2, a lower run of the conveyor belt 42 passes over guide roller 60, then extends under drive roller 54 and finally passes over tensioning roller 62. The tensioning roller 62 is moveable back and forth in side plate slots (one being seen at 64 in FIGS. 1 and 2) by means of a pair of tensioning cylinders 66, 68 to further adjust tension on the conveyor belt 42 within the center drive unit 26. Further details on the specific structure used to attain this tensioning roller movement are set forth in the aforementioned pending U.S. patent application. Once the tensioning roller 62 is properly set and the belt 42 is properly threaded through the center drive unit 26, the drive motor 56 is activated to move the conveyor belt 42.

While the drive roller 54 in the center drive unit 26 performs generally satisfactorily, it is known that the outer peripheral wall or surface 57 of the drive roller 54 must be machined along both sides with a smooth surface and further machined in the central portion to form the groove 58 for receiving the belt rib 40. Such machining can be costly especially if there is a large amount of surface area as is the case with large rollers having lengths of four feet and diameters of six inches.

Referring now to FIGS. 3 through 8, a multi-section drive roller 70 of the present invention improves upon the prior art drive roller 54 and provides exterior wall formation for maintaining belt tracking and facilitating assembly/ disassembly of the roller as well as the desired smooth surface for belt engagement, all in a manner which eliminates machining of the drive roller exterior wall.

Drive roller 70 is comprised of a plurality of aligned, adjacently disposed roller segments 72a, b, c, d, e, f attached to an elongated center shaft 74 by means of threaded fasteners 76a, b, c. Each fastener 76a, b, c carries a respective circular retainer 77a, b, c which extends radially outwardly beyond the periphery of the fastener head. The drive roller 70 is constructed and arranged to form a belt-receiving, circumferentially extending center gap 78, and a series of longitudinally extending, peripheral gaps 80a, b, c, d, e, f which intersect the center gap 78.

Figure 6:
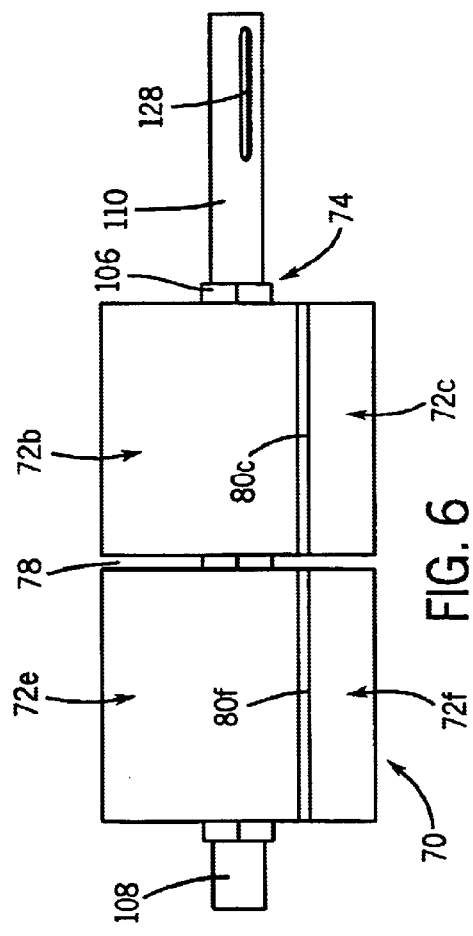
FIG. 6 is an elevational view taken from the left side of the drive roller in FIG. 4.
Figure 3:
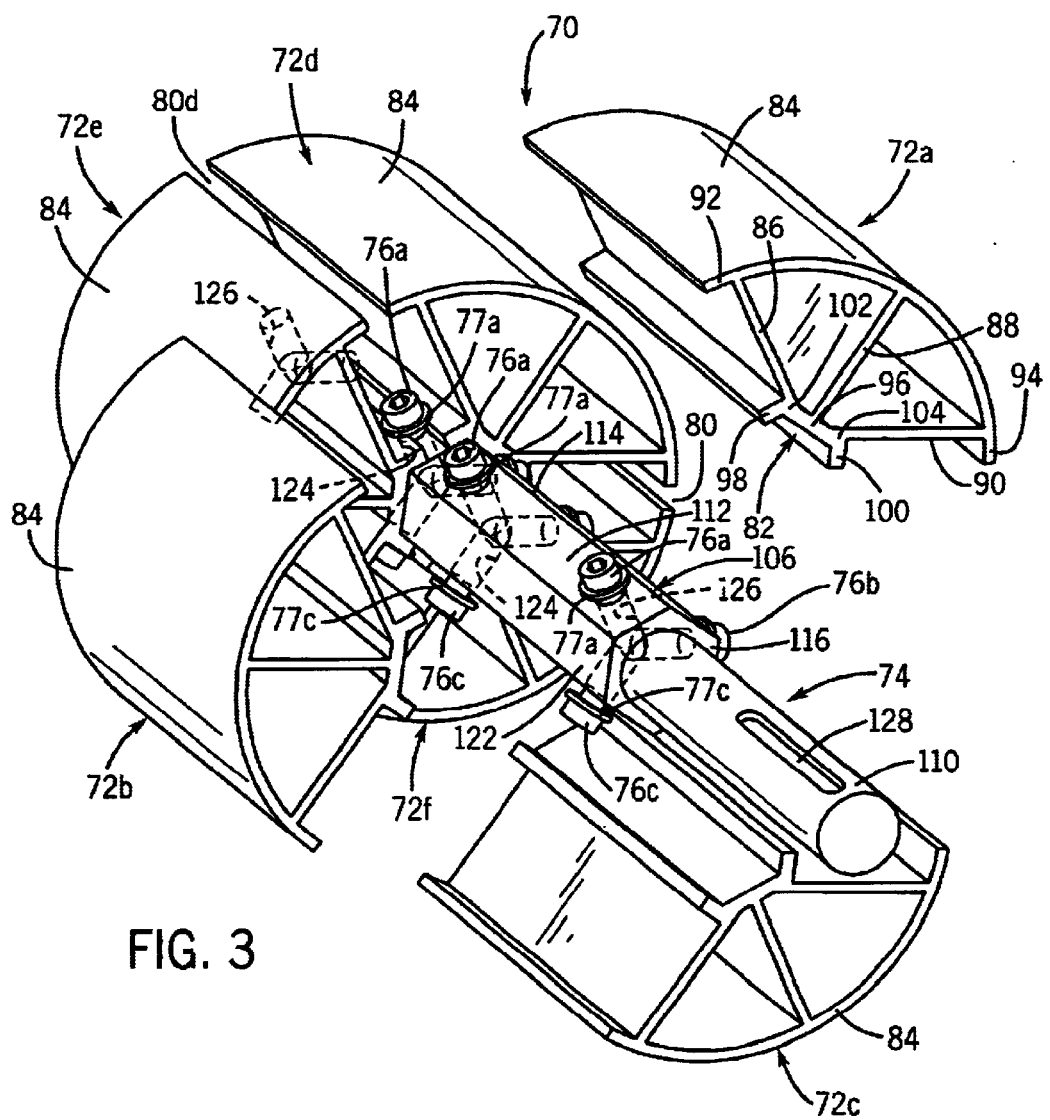
FIG. 3 is a partially exploded, perspective view of the conveyor drive roller of the present invention.

In the illustrated embodiment, the drive roller 70 includes six identical roller segments 72a–f preferably extruded from aluminum. Three segments 72a, b, c are located on one side of a vertical plane bisecting a longitudinal axis of the center shaft 74, and three segments 72d, e, f are located on the other side of the vertical plane. Each roller segment 72a–f is defined by a mounting portion 82, a curved outer wall surface 84 and three radially extending inner walls 86, 88, 90 extending between the mounting portion 82 and the curved outer wall surface 84. As best seen in FIGS. 3, 4 and 6, longitudinally extending, opposite ends 92, 94 of each curved outer wall surface 84 terminate slightly beyond the radially outermost ends of inner walls 86 and 90. Each mounting portion 82 includes a longitudinally extending base 96 and a pair of longitudinally extending, outwardly diverging tabs 98, 100 formed on opposed ends 102, 104. Radially innermost ends of inner walls 86, 90 are connected to opposed ends 102, 104 of the base 96, and a radially innermost end of inner wall 88 is joined to a midportion of the base 96.

Center shaft 74 is formed with a middle section or hub 106 of hexagonal cross section flanked by a pair of opposed, first and second cylindrical ends 108, 110 which project beyond ends of the hub 106. The hexagonal shape of the hub 106 provides six external faces 112, 114, 116, 118, 120, 122 (FIG. 8) which define its outer periphery and serve as mounting surfaces for each adjacent pair of roller segments 72a–f as will be understood more clearly below. Alternate faces 112, 116, 120 are formed with two inwardly projecting, inner threaded holes 124 and two inwardly projecting, outer threaded holes 126. Each of the holes 124, 126 is centrally located along the length of its particular face 112, 116 or 120 for rotatably receiving a threaded shaft of one of the fasteners 76a, b, c. The first cylindrical end 108 of center shaft 74 extends through an opening in the side plate 50 (FIG. 1) and is retained within a bearing assembly (not shown). The second cylindrical end 110 of central shaft 74 passes through an opening in the opposite side plate 52 (FIG. 1) and is received within a bearing assembly (not shown). In addition, the second cylindrical end 110 is formed with a slotted opening 128 to facilitate coupling to the drive motor 56 (FIG. 1) so as to rotate the drive roller 70.

Prior to assembly of the drive roller 70, all fasteners 76a, b, c are partially threaded into respective holes 124, 126 so that retainer 76a, b, c are slightly raised just enough from the faces 112, 116, 120 respectively, to allow tabs 98, 100 to slide therebeneath. In addition, a spacer (not shown) is placed around the hub 106 in the center thereof to facilitate proper axial positioning of the roller segments 72a–c relative to roller segments 72d–f.

To assemble a first half of the drive roller 70, roller segments 72a, b, c are positioned around the central shaft 74 so that their respective mounting portions 82 are placed around certain of the external faces 112–122 on hub 106. In a preferred example for assembly, referring to FIGS. 3 and 6, an inner end of a first roller segment 72a is placed at the outer end of hub 106 facing cylindrical end 110 so that base 96 lies flush against the external face 114, tab 98 lies partially along one adjacent hub external face 112 beneath retainer 77a and tab 100 lies partially along another adjacent hub external face 116 beneath retainer 77b. Then, an assembler slides the roller segment 72a inwardly along the hub 106 and against the center spacer so that tabs 98, 100 are loosely retained beneath retainers 77a, b. An inner end of a second roller segment 72b is engaged at the outer end of hub 106 so that the base 96 lies flush against hub external face 122, tab 98 lies partially along one adjacent hub external face 120 beneath retainer 77c and tab 100 lies partially along another adjacent hub external base 112 beneath retainer 77a. The assembler then slides roller segment 72b inwardly along hub 106 and against center spacer so that tabs 98, 100 are loosely retained beneath retainers 77a, c. With the first two roller segments 72a, b in position, the opposed ends 92, 94 of the adjacent curved outer wall surfaces 84 are purposely separated from one another to define a peripheral gap 80a. An inner end of roller segment 72c is similarly positioned at the outer end of hub 106 so that base 96 lies flush against external face 118, tab 98 lies partially along hub external face 116 beneath retainer 77b, and tab 100 lies partially along hub external face 120 beneath retainer 77c. The assembler then slides the roller segment 72c along hub 106 and inwardly against spacer so that tabs 98, 100 are loosely held beneath retainers 77b, c. With the third roller segment 72c in position, the opposed ends 92, 94 of the curved outer wall surfaces 84 between segments 72a and 72c, and between segments 72b and 72c define peripheral gaps 80b and 80c, respectively.

A similar procedure is followed to assemble roller segments 72d, e, f along the other half of hub 106 except that the segments are placed at the outer end of hub 106 adjacent the opposed cylindrical end 108. An assembler then slides segments 72d, e, f inwardly against spacer so that tabs 98, 100 are loosely held beneath retainers 77a, b, c to define peripheral gaps 80d, e, f.

With the roller segments 72a–f positioned loosely in place upon hub 106, the assembler inserts a fastening tool having an elongated shaft with appropriate driving structure through the gaps 80a–f to tighten the fasteners 76a, b, c and complete assembly. The assembled drive roller shown in FIGS. 4, 5, 6 and 7 further defines the circumferentially extending center gap 78. As can be appreciated, peripheral gaps 80a and 80d are aligned to form a first assembly facilitating gap. Peripheral gaps 80b and 80e are aligned to form a second assembly facilitating gap. Peripheral gaps 80c and 80f are aligned to form a third assembly facilitating gap. Each of the three assembly facilitating gaps intersect the center gap 78 at 90 degree angles. In the assembled drive roller 70, each adjacent pair of curved outer wall surfaces 84 are aligned so as to form smooth belt-engaging surfaces which require no machining.

As illustrated in FIG. 4, as the conveyor belt 42 wraps around drive roller 70, the center gap 78 receives belt rib 40 on the inner surface of the belt when drive roller 70 is driven by drive motor 56. As a result, with the driving of roller 70, belt tracking will occur as center belt rib 40 continuously engages the innermost edges of curved outer wall surfaces 84 forming center gap 78. In addition, it should be appreciated that when the roller 70 is stationary, an assembler is able to access the gaps formed by aligned, longitudinally extending gaps 80a and 80d, 80b and 80e, and 80c and 80f with a suitable tool so as to facilitate tightening and/or loosening of the fasteners 76a, b, c during assembly and/or disassembly of roller 70. The drive roller 70, constructed of extruded roller segments 72a–f and assembled to define the center and assembly facilitating gaps, is economically provided without requiring any machining on the outer peripheral surfaces 84 of the roller 70.

In the embodiment illustrated, the segmented roller construction has been described relative to the drive roller of the center drive unit 26 in a conveyor frame assembly 22. However, it should be understood that the present invention may apply to other conveyor rollers, such as a drive roller mounted on the end of a conveyor frame assembly or to other conveyor rollers as may be desired. It should be further understood that while the preferred embodiment describes six roller segments for use with a hexagonal hub, the present invention contemplates other combinations of roller segments used with other hubs of other cross-sectional configurations.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. A multi-section roller comprising:
   a rotatable mounting hub having a plurality of external face surfaces; and
   a plurality of roller segments each removably attachable to at least one of the external face surfaces of the mounting hub, each roller segment having a curved outer wall surface, wherein the plurality of roller segments combine to define a roller outer wall surface when the roller segments are attached to the mounting hub,
   wherein each of the external face surfaces of the hub receives a plurality of fasteners to secure the roller segments to the mounting hub, each of the fasteners having a retaining head,
   wherein the roller segments have mounting portions connected to the curved outer wall surfaces and retained by the fasteners on the hub,
   wherein the mounting portions are engaged flush against at least one of the external face surfaces of the hub, and
   wherein each mounting portion has a base and a pair of outwardly diverging tabs inserted and held between the retaining heads of the fasteners and one of the external face surfaces of the hub.

2. The roller of claim 1, wherein the curved outer wall surfaces of the roller segments are separated from each other by a gap that extends along a longitudinal axis of the mounting hub when the roller segments are attached to the mounting hub.

3. The roller of claim 2, wherein the gap between the outer wall surfaces of the roller segments is adapted to receive a tool for facilitating assembly and disassembly of the roller.

4. The roller of claim 1, wherein the roller segments include radially extending walls joining the curved outer wall surfaces to the mounting portions.

5. A multi-section roller comprising:
   a rotatable mounting hub having a plurality of external face surfaces; and
   a plurality of roller segments each removably attachable to at least one of the external face surfaces of the mounting hub, each roller segment having a curved outer wall surface, wherein the plurality of roller segments combine to define a roller outer wall surface when the roller segments are attached to the mounting hub,
   wherein the curved outer wall surfaces of the roller segments are separated from each other by a gap that extends along a longitudinal axis of the mounting hub when the roller segments are attached to the mounting hub,
   wherein each of the external face surfaces of the hub receives a plurality of fasteners to secure the roller segments to the mounting hub,
   wherein the gaps include at least one circumferentially extending gap and a plurality of longitudinally extending gaps formed by end structure on the curved outer wall surfaces fixed to the mounting hub, and
   wherein the longitudinally extending gaps provide access to the fasteners attached to the hub.

6. The roller of claim 5, wherein each of the roller segments is formed from extruded aluminum.

7. A multi-section conveyor roller engageable with a conveyor belt movably mounted on a conveyor frame assembly, the roller comprising:
   a rotatable mounting hub connected to the conveyor frame assembly; and
   a plurality of roller segments fixed to the mounting hub to form belt-engaging, curved outer wall surfaces separated by a number of gaps, at least one of the gaps receiving rib structure provided on the conveyor belt for maintaining proper movement of the conveyor belt on the conveyor frame assembly.

8. The conveyor roller of claim 7, wherein other of the gaps are adapted to receive a tool for facilitating assembly and disassembly of the roller.

9. The conveyor roller of claim 7, wherein the hub is operably coupled to a drive motor for rotating the roller segments fixed to the hub.

10. The conveyor roller of claim 7, wherein the hub has an outer peripheral surface for receiving a plurality of fasteners, each of the fasteners having a retaining head.

11. The conveyor roller of claim 10, wherein the roller segments have mounting portions connected to the curved outer wall surfaces and retained by the fasteners on the hub.

12. The conveyor roller of claim 11, wherein the roller segments include radially extending walls joining the curved outer wall surfaces to the mounting portions.

13. The conveyor roller of claim 11, wherein the mounting portions are engaged flush against the outer peripheral surface of the hub.

14. The conveyor roller of claim 13, wherein each mounting portion has a base and a pair of outwardly diverging tabs inserted and held between the retaining heads of the fasteners and the peripheral surface of the hub.

15. The conveyor roller of claim 10, wherein the gaps include at least one circumferentially extending gap and a plurality of longitudinally extending gaps formed by end structure on the curved outer wall surfaces fixed to the mounting hub.

16. The conveyor roller of claim 15, wherein the rib structure includes a rib extending longitudinally along the conveyor belt for engagement with the end structure forming the circumferentially extending gap.

17. The conveyor roller of claim 15, wherein the longitudinally extending gaps provide access to the fasteners attached to the hub.

18. In a conveyor construction having a frame assembly including a pair of spaced side members, a moveable conveyor belt positioned between the side members and a powered drive roller rotatably mounted on the frame assembly and engaged with the conveyor belt for moving the conveyor belt around the frame assembly, the improvement wherein:
   the drive roller includes a plurality of adjacently disposed, identical roller segments fixed to a mounting hub rotatably attached to the frame assembly to define aligned, belt-engaging, outer wall surfaces spaced apart by a female belt tracking and assembly facilitating arrangement engageable with a male belt tracking structure located on the conveyor belt,
   wherein the female belt tracking and assembly facilitating arrangement includes at least one circumferentially extending gap defined by innermost edges of the adjacently disposed roller segments, and
   wherein the female belt tracking and assembly facilitating arrangement includes a series of longitudinally extending gaps defined by axially extending ends of the curved outer wall surfaces.

19. The improvement of claim 18, wherein the drive roller is included in a center drive unit mounted beneath the frame assembly.

20. The improvement of claim 18, wherein the male belt tracking structure includes at least one rib extending along a longitudinal axis of the conveyor belt on an inner surface thereof.

21. The improvement of claim 18, wherein the longitudinally extending gaps intersect the circumferentially extending gap at a 90 degree angle.

22. A segmented conveyor roller engageable with a conveyor belt movably mounted on a conveyor frame assembly, the roller comprising:

a driven mounting hub rotatably attached to the frame assembly, the hub having a hexagonally shaped outer peripheral surface defined by first, second, third, fourth, fifth, and six adjacently disposed faces, the first, third and fifth faces carrying a plurality of threaded fasteners having retaining heads; and a set of six adjacently disposed roller segments, three segments being located on a first half of the hub and three segments being located on a second half of the hub, each roller segment having a mounting portion and a curved outer wall surface connected by radially extending walls, each mounting portion having a base flanked by a pair of outwardly diverging tabs, the bases being engaged against the second, fourth and sixth faces, and the tabs of adjacently disposed roller segments extending partially along the first, third and fifth faces for engagement between the retaining heads of the fasteners and the first, third and fifth faces, whereby with the roller segments attached to the hub, the curved outer wall surfaces are aligned with one another and include axially extending ends separated from each other to form three longitudinally extending gaps for providing access to the threaded fasteners so as to facilitate assembly/disassembly of the roller, the curved outer wall surfaces also including innermost ends separated from one another to form a single circumferentially extending center gap for receiving a single longitudinally extending rib on the conveyor belt for maintaining belt tracking.

\* \* \* \* \*